United States Patent Office 2,708,672
Patented May 17, 1955

2,708,672

11β,17α-DIHYDROXYPREGNANE-3,20-DIONE AND PROCESS

Barney J. Magerlein, Kalamazoo, and Robert H. Levin, Kalamazoo Township, Kalamazoo County, Mich., assignors to The Upjohn Company, Kalamazoo, Mich., a corporation of Michigan No Drawing. Application October 27, 1952, Serial No. 317,158

5 Claims. (Cl. 260—397.45)

The present invention relates to a certain steroid compound and is more particularly concerned with the novel 11β,17α-dihydroxypregnane-3,20-dione and with a process of the production thereof.

The novel compound of the present invention and the sequence of the process for the production thereof may be represented by the following illustrative structural formulae:

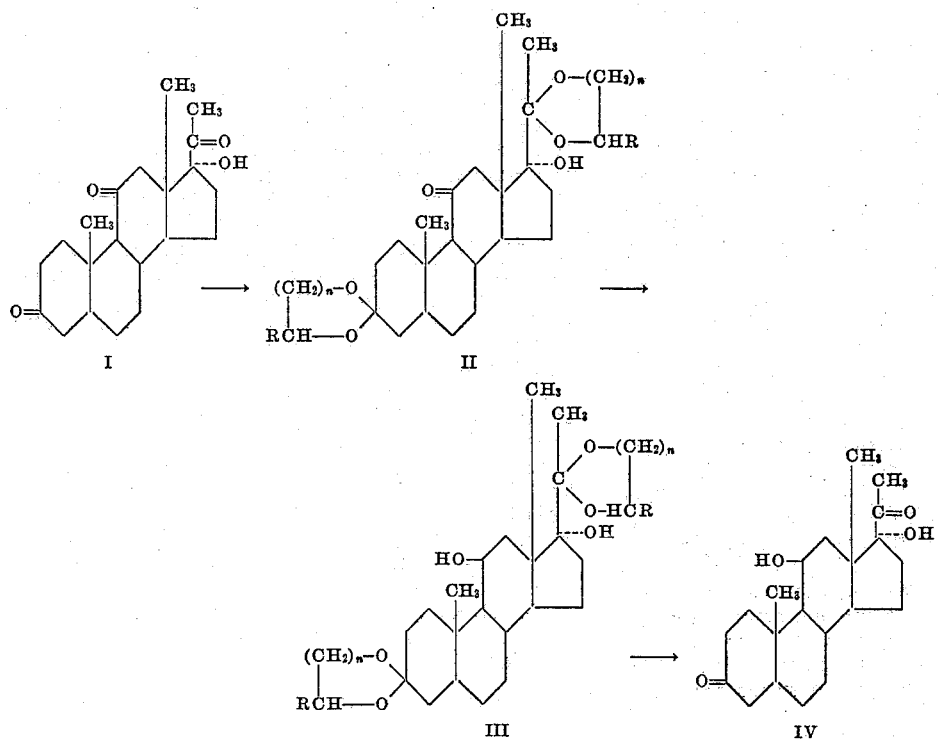

wherein R is selected from the group consisting of hydrogen and lower-alkyl groups, such as, for example, methyl, ethyl, propyl, isopropyl, butyl, isobutyl, amyl, hexyl, and the like, and wherein $n$ is an integer from one to two inclusive.

The process of the present invention consists in heating together 17α-hydroxypregnane-3,11,20-trione (I) with an alkanediol, preferably an alkane-1,2-diol or alkane-1,3-diol, as for example, ethylene glycol, propane-1,2-diol, propane-1,3-diol, butane-1,2-diol, butane-2,3-diol, pentane-1,2-diol, 3-methylpentane-1,2-diol, hexane-1,3-diol, and the like in the presence of an acid catalyst, to obtain the corresponding 17α-hydroxypregnane-3,11,20-trione, 3,20-cyclic diketal (II). Reduction of a diketal of Formula II with a reducing agent, e. g., a metallic hydride or hydrogen in the presence of a catalyst, is productive of a 11β,17α-dihydroxypregnane-3,20-dione, 3,20-cyclic diketal (III) which is hydrolyzed with acid to give 11β,17α-dihydroxypregnane-3,20-dione (IV).

It is an object of the present invention to provide the novel 11β,17α-dihydroxypregnane-3,20-dione. Another object of the invention is to provide a process for the production of 11β,17α-dihydroxypregnane-3,20-dione through the formation of a diketal. Other objects of this invention will be apparent to one skilled in the art to which this invention pertains.

The novel compound of the present invention has utility as a stable, solid intermediate for the preparation of physiologically active substance such as, for example, Kendall's Compound "F" acetate (11β,17α-dihydroxy-21-acetoxy-4-pregnene-3,20-dione), and the new compound, 11β,17α-dihydroxy-4-pregnene-3,20-dione. For this purpose, 11β,17α-dihydroxypregnane-3,20-dione is halogenated to give 4-halo-11β,17α-dihydroxypregnane-3,20-dione. Treating this compound with semicarbazide followed by pyruvic acid gives 11β,17α-dihydroxy-4-pregnene-3,20-dione which by treatment with lead tetraacetate is productive of Kendall's Compound "F" acetate. 11β,17α-dihydroxy-4-pregnene-3,20-dione has a pronounced inhibiting effect on the secretion of adrenocorticotrophic hormone (ACTH) and therefore is of value in the treatment of diseases where over-secretion of ACTH and adrenal hormones occurs, for example in adrenal hyperplasia and pituitary basophilism (Cushing's disease).

In carrying out the process of the present invention, 17α-hydroxypregnane-3,11,20-trione is admixed, using either order of addition, with at least the theoretical amount of an alkanediol, e. g., an alkane-1,2-diol or alkane-1,3-diol, in an organic solvent, which is non-reactive under the reaction conditions, e. g., at a temperature between about twenty and about 200 degrees centigrade, preferably between about twenty and about 150 degrees centigrade. Ordinarily, it is preferred to use an excess of the alkanediol, preferably between about five and about fifty moles per mole of the starting steroid. The time required for reaction is not critical and may be varied between about one and about 48 hours, the length of time being dependent on the temperature, the ketalizing reagent and catalyst employed.

The reaction can be conducted in any organic solvent with which the reactants and products are non-reactive, such as, for example, benzene, toluene, xylene, methylene chloride, petroleum ether, ether, and the like. However, the preferred solvents are those which co-distill with water and hence remove the water as it is formed in the course of the reaction. For this reason the reaction is usually conducted at the reflux temperature of the mixture, such temperature depending, of course, upon the solvent and the particular reaction conditions, e. g., pressure, employed.

The ketal-forming agents of the present invention are alkane-diols, preferably alkane-1,2-diols or alkane-1,3-diols, such as, for example, ethylene glycol, propane-1,2-diol, propane-1,3-diol, butane-1,2-diol, butane-2,3-diol, pentane-1,2-diol, 3-methylpentane-1,2-diol, hexane-1,3-diol, octane-1,2-diol, and the like. The catalyst used in the method of the present invention may be any suitable acid catalyst and is preferably a mineral acid or an organic sulfonic acid. Representative catalysts are the meta- and para-toluenesulfonic acids, naphthalenesulfonic acid, benzenesulfonic acid, ortho-chlorobenzenesulfonic acid, hydrochloric acid, and sulfuric acid, with benzenesulfonic acids, e. g., para-toluenesulfonic acid, being preferred.

To reduce the thus-obtained $17\alpha$-hydroxypregnane-3,11,20-trione, 3,20-cyclic diketal to a $17\alpha,11\beta$-dihydroxypregnane-3,20-dione, 3,20-cyclic diketal, a reducing agent is added to the solution of the diketal in a solvent which is non-reactive under the conditions of reaction. Reducing agents such as, for example, lithium aluminum hydride, lithium borohydride, sodium borohydride, hydrogen in the presence of catalysts such as platinum or Raney nickel, and others are operative, with lithium aluminum hydride being preferred. Solvents such as, for example, ether, benzene, tetrahydrofuran, petroleum ether and others are satisfactory. In the preferred embodiment of the process, lithium aluminum hydride is admixed with a suitable organic solvent such as, for example, ether, and the starting steroid dissolved in a non-reactive solvent such as, for example, benzene, and the mixtures then combined to form the reaction mixture.

The temperature of the reaction mixture is usually maintained between about zero and about 100 degrees centigrade, with a temperature between about room temperature and the reflux temperature of the reaction mixture being preferred, for a reaction period varying from about one-half to about eight hours or more. When lithium aluminum hydride is used as the reducing agent, the reaction is advantageously first conducted at temperatures between about zero and about fifty degrees centigrade, preferably at about room temperature, while during the latter phases of the reaction higher temperatures are utilized, the reflux temperature of the reaction mixture usually being the upper temperature limit. The reactants are preferably admixed and stirred for about thirty minutes to one hour at room temperature and subsequently refluxed for thirty minutes or longer under atmospheric pressure, the total reaction time depending in part on the ratio of the starting reactants and on the temperatures employed.

The ratio of reducing agent to starting steroid may be varied considerably over a wide range, a substantial excess of the reducing agent generally being employed with mole-ratios of up to fifty to one and above being operative.

The desired $11\beta,17\alpha$-dihydroxypregnane-3,11,20-trione, 3,20-cyclic diketal is separated from the reaction product by conventional procedures. Thus, when employing reducing agents such as lithium aluminum hydride or sodium borohydride, the reaction mixture is hydrolyzed upon completion of the reduction and the $11\beta,17\alpha$-dihydroxypregnane-3,11,20-trione, 3,20-cyclic diketal is obtained by solvent extraction of the reaction mixture.

In order to obtain $11\beta,17\alpha$-dihydroxypregnane-3,20-dione from $11\beta,17\alpha$-dihydroxypregnane-3,20-dione, 3,20-cyclic diketal, the selected diketal is usually dissolved in a solvent which is non-reactive under the condition of the reaction and the solution is then admixed with a hydrolyzing agent. Aqueous acids are generally employed as hydrolyzing agents, such as, for example, dilute mineral acids, organic acids such as para-toluenesulfonic acid in the presence of water, phosphoric acid, and others, with dilute mineral acids such as hydrochloric and sulfuric being preferred. Certain organic acids and other acidic agents are sometimes employed. Solvents such as acetone, methanol, dioxane, ethanol, and the like may be used, with acetone being preferred. Frequently it is desirable, as illustrated in Example 2, to utilize the reaction mixture from the prior step involving lithium aluminum hydride reduction of the $17\alpha$-hydroxypregnane-3,11,20-trione, 3,20-diketal without first isolating the $17\alpha,11\beta$-dihydroxypregnane-3,20-dione, 3,20-diketal reaction product. In such case, the starting hydrolysis reaction mixture may also contain substantial quantities of unreacted lithium aluminum hydride and a mixture of solvents such as ether, benzene, and the like.

The hydrolyzing agent is usually employed in amounts greater than that theoretically required to completely hydrolyze the starting steroid. A one to 100-fold excess, or more, of hydrolyzing agent is operative, with a five to ten-fold excess usually being preferred. Usually the reaction mixture is stirred for about 24 hours at room temperature. The reaction period may be longer or as short as one hour, depending in part on the ketal used, in part on the reaction temperature, and in part on the concentration of the hydrolyzing agent. Use of higher concentrations of hydrolyzing agent and higher temperatures usually reduces the required reaction period, temperatures between about zero degrees centigrade and about the boiling point of the reaction mixture being operative.

When hydrolysis is substantially complete, the product is isolated by conventional procedure, for example, when the resulting mixture is composed of an organic layer and a water layer, the organic layer is separated, the water layer is extracted with ether, and the ether solutions are combined. The combined ether extracts are then washed with water and dried using a drying agent such as anhydrous sodium sulfate. Filtration to remove the drying agent and distillation to remove the solvent gives the isolated product, which may be recrystallized from any of the common organic solvents. Alternatively, the product may be isolated by removing the solvent through distillation or by diluting the reaction mixture with water until crystallization of the product takes place.

The following examples illustrate the process and product of the present invention but are not to be construed as limiting.

EXAMPLE 1.—$17\alpha$-HYDROXYPREGNANE-3,11,20-TRIONE, 3,20-ETHYLENE GLYCOL DIKETAL A solution of 25 grams of $17\alpha$-hydroxypregnane-3,11,20-trione, 25 milliliters of distilled ethylene glycol, one gram of paratoluenesulfonic acid monohydrate and 500 milliliters of benzene was placed in a reaction flask equipped with a reflux condenser and a water trap. The mixture was heated under reflux with stirring for ten hours, the water which formed was removed by co-distillation with benzene and was collected in the water trap. The reaction mixture was cooled, washed with dilute sodium bicarbonate solution and with water, and then dried and concentrated to dryness under reduced pressure. The white crystalline residue was recrystallized repeatedly from ethyl acetate-Skellysolve B solution to yield 29.52 grams (94.6 percent) of $17\alpha$-hydroxypregnane-3,11,20-trione, 3,20-ethylene glycol diketal of melting point 185–186 degrees centigrade.

*Analysis.*—Calculated for $C_{25}H_{38}O_6$: C, 69.09; H, 8.81. Found: C, 69.01; H, 9.02.

Infrared analysis confirmed the postulated structure for

17α-hydroxypregnane-3,11,20-trione, 3,20-ethylene glycol diketal.

(A) *11β,17α - dihydroxypregnane-3,20-dione, 3,20-ethylene glycol diketal*

To a solution of five grams of lithium aluminum hydride dissolved in 600 milliliters of anhydrous ether was added 29.5 grams of 17α-hydroxypregnane-3,11,20-trione, 3,20-ethylene glycol diketal dissolved in a solution of one hundred milliliters of ether in one hundred milliliters of benzene. The resulting mixture was stirred for one hour at room temperature after which time it was refluxed for another hour and then cooled and hydrolyzed with fifty milliliters of water. The organic layer was separated by decantation and the remaining paste was suspended in water and repeatedly extracted with methylene dichloride. The combined ether and methylene dichloride solutions were concentrated to give a quantitative yield of crystalline 11β,17α-dihydroxypregnane-3,20-dione, 3,20-ethylene glycol diketal. Infrared analysis confirmed the postulated structure for 11β,17α-dihydroxypregnane-3,20-dione, 3,20-ethylene glycol diketal.

(B) *11β,17α-dihydroxypregnane-3,20-dione*

Twenty-nine and one-half grams of 11β,17α-dihydroxypregnane-3,20-dione, 3,20-ethylene glycol diketal was dissolved in 600 milliliters of acetone and a solution of four milliliters of sulfuric acid in 100 milliliters of water was added thereto. The solution thus-obtained was allowed to stand at room temperature during a period of sixteen hours, after which time the acid was neutralized with sodium bicarbonate and the acetone distilled off in vacuo. The remaining aqueous suspension was filtered and the crystalline precipitate was washed with water and dried. The crude yield was 19.5 grams (82.7 percent). After recrystallization of this material from 200 milliliters of ethyl acetate, 14.04 grams (46.7 percent) of 11β,17α-dihydroxypregnane-3,20-dione of melting point 213 to 221 degrees centigrade was obtained.

EXAMPLE 2.—17α - HYDROXYPREGNANE - 3,11,20 - TRIONE, 3,20-ETHYLENE GLYCOL DIKETAL

A solution of 700 milligrams of 17α-hydroxypregnane-3,11,20-trione, five milliliters of predistilled ethylene glycol, fifty milligrams of ortho-chlorobenzenesulfonic acid and 150 milliliters of benzene was refluxed for ten hours in a reaction flask equipped with a reflux condenser and a water trap. The water which was formed was removed by co-distillation with benzene and was collected in the water trap. The reaction mixture was cooled, washed with fifty milliliters of dilute sodium bicarbonate solution and with water, and then dried and concentrated to dryness under reduced pressure. The white crystalline residue was recrystallized repeatedly from ethyl acetate-Skellysolve B solution to yield about 600 milligrams of 17α-hydroxypregnane-3,11,20-trione, 3,20-ethylene glycol diketal.

(A) *11β,17α-dihydroxypregnane-3,20-dione*

One gram of 17α-hydroxypregnane-3,11,20-trione, 3,20-ethylene glycol diketal, dissolved in twenty milliliters of anhydrous benzene, was added to a solution of one gram of lithium aluminum hydride dissolved in 75 milliliters of anhydrous ether. The reaction mixture was stirred for one hour at room temperature and heated under reflux for one hour. Without isolating the intermediate 11β,17α-dihydroxypregnane-3,20 - dione, 3,20-ethylene glycol diketal, the lithium aluminum complex of the diketal was hydrolyzed to give 11β,17α-dihydroxypregnane-3,20-dione by the slow addition of one hundred milliliters of dilute hydrochloric acid (fifty percent) and stirring of the acid mixture for a period of sixteen hours at room temperature. The organic layer was separated and the acidic solution extracted repeatedly with 25-milliliter portions of ether. The combined washings and organic layer are washed with sodium bicarbonate and water, and then dried over anhydrous sodium sulfate. 11β,17α-dihydroxypregnane - 3,20 - dione was recrystallized from ethyl acetate and had a melting point of 208 to 212 degrees centigrade.

*Analysis*:—Calculated for $C_{21}H_{32}O_4$: C, 72.38; H, 9.26. Found: C, 72.51; H, 9.09.

EXAMPLE 3.—17α-HYDROXYPREGNANE - 3,11,20 - TRIONE, 3,20-PROPYLENE GLYCOL DIKETAL

A solution of 0.50 gram of 17α-hydroxypregnane-3,11,20-trione, five milliliters of propylene glycol, fifty milligrams of orthochlorobenzenesulfonic acid, dissolved in one hundred milliliters of toluene was heated to the boiling temperature and refluxed for ten hours, while the water which formed in the reaction was removed by co-distillation with toluene. The cooled solutiton was neutralized with sodium bicarbonate, washed with water, dried and concentrated to dryness in vacuo. The crystals of 17α-hydroxypregnane-3,11,20-trione, 3,20-propylene glycol diketal were recrystallized from ethyl acetate.

(A) *11β,17α-dihydroxypregnane-3,20-dione, 3,20-propylene glycol diketal*

To a solution of one gram of lithium aluminum hydride, dissolved in 75 milliliters of ether, was added one gram of 17α-hydroxypregnane-3,11,20-trione, 3,20-propylene glycol diketal dissolved in 20 milliliters of benzene. The mixture was stirred for one hour at room temperature after which time it was refluxed for another hour and then cooled and hydrolyzed by addition of water. The organic layer was separated, washed with water, dried, and concentrated to dryness to give 11β,17α-dihydroxypregnane-3,20-dione, 3,20-propylene glycol diketal.

(B) *11β,17α-dihydroxypregnane-3,20-dione*

Following the procedure given in Example 1B, 11β,17α-dihydroxypregnane-3,20-dione, 3,20-propylene glycol diketal was hydrolyzed in acetone solution with dilute sulfuric acid to produce 11β,17α-dihydroxypregnane-3,20-dione.

Alternatively 11β,17α-dihydroxypregnane - 3,20 - dione may be obtained from 17α-hydroxypregnane-3,11,20-trione, 3,20-propylene glycol diketal by reduction of the diketal with lithium aluminum hydride and hydrolysis of the lithium aluminum complex with hydrochloric acid in the manner described in Example 2A.

EXAMPLE 4.—17α-HYDROXYPREGNANE-3,11,20-TRIONE, 3,20-PROPANE-1,3-DIOL DIKETAL

In essentially the same manner as shown in Example 1, 17α-hydroxypregnane-3,11,20-trione, 3,20-propane-1,3-diol diketal is prepared by heating 17α-hydroxypregnane-3,11,20-trione with propane-1,3-diol dissolved in benzene with para-toluenesulfonic acid as catalyst.

(A) *11β - 17α - dihydroxypregnane-3,20-dione, 3,20-propane-1,3-diol diketal*

Following the procedure given in Example 1A, 11β,17α - dihydroxypregnane - 3,20 - dione, 3,20 - propane-1,3-diol diketal is prepared useing 17α-hydroxypregnane-3,11,20-trione, 3,20-propane-1,3-diol diketal instead of 17α-hydroxypregnane-3,11,20-trione, 3,20 - ethylene glycol diketal.

(B) *11β,17α-dihydroxypregnane-3,20-dione*

Following the procedure described in Example 1B, 11β,17α-dihydroxypregnane-3,20-dione is prepared by hydrolyzing 11β,17α-dihydroxypregnane-3,20-dione, 3,20-propane-1,3-diol diketal in acetone and aqueous sulfuric acid instead of 11β,17α-dihydroxypregnane-3,20-dione, 3,20-ethylene glycol diketal.

Alternatively, 11β,17α - dihydroxypregnane-3,20-dione may be obtained from 17α-hydroxypregnane-3,11,20-trione, 3,20-propane-1,3-diol diketal by reduction of the diketal with lithium aluminum hydride and hydrolysis of the lithium aluminum complex with hydrochloric or sulfuric acid in the manner described in Example 2A.

In a manner similar to Examples 1 through 4, by reacting 17α-hydroxypregnane-3,11,20-trione with an alkanediol, preferably an alkane-1,2-diol or alkane-1,3-diol, in the presence of an acid catalyst in solution, the following representative compounds may be obtained: 17α - hydroxypregnane - 3,11,20 - trione, 3,20 - butane-1,2 - diol diketal, 17α - hydroxypregnane - 3,11,20-trione, 3,20 - butane - 2,3 - diol diketal, 17α - hydroxypregnane - 3,11,20 - trione, 3,20 - pentane - 1,2 - diol diketal, 17α - hydroxypregnane - 3,11,20 - trione, 3,20-hexane - 1,2 - diol diketal, 17α - hydroxypregnane - 3,11,20 - trione, 3,20 - heptane - 1,2 - diol diketal, 17α-hydroxypregnane - 3,11,20 -trione, 3,20 - octane - 1,2-diol diketal, 17α - hydroxypregnane - 3,11,20 - trione, 3,20 - butane - 1,3 - diol diketal, 17α - hydroxypregnane-3,11,20 - trione, 3,20 - pentane - 1,3 - diol diketal, 17α-hydroxypregnane - 3,11,20 - trione, 3,20 - hexane - 1,3-diol diketal, 17α - tydroxypregnane - 3,11,20 -trione, 3,20 - heptane - 1,3 - diol diketal, 17α - hydroxypregnane - 3,11,20 - trione, 3,20 - octane - 1,3 - diol diketal, and similar like compounds.

Treatment of these compounds with metallic hydrides or hydrogen in the presence of a catalyst as described in Examples 1A, 3A and 4A, is productive of the following representative 11β,17α - dihydroxypregnane - 3,20 - dione, 3,20 - cyclic diketals: 11β,17α - dihydroxypregnane-3,20 - dione, 3,20 - butane - 1,2 - diol diketals, 11β,17α-dihydroxypregnane - 3,20 - dione, 3,20 - butane - 2,3-diol diketal, 11β,17α - dihydroxypregnane - 3,20 - dione, 3,20 - pentane - 1,2 - diol diketal, 11β,17α - dihydroxypregnane - 3,20 - dione, 3,20 - hexane - 1,2 - diol diketal, 11β,17α - dihydroxypregnane - 3,20 - dione, 3,20 - heptane - 1,2 - diol diketal, 11β,17α - dihydroxypregnane-3,20 - dione, 3,20 - octane - 1,2 - diol diketal, 11β,17α-dihydroxypregnane - 3,20 - dione, 3,20 - butane - 1,3-diol diketal., 11β,17α - dihydroxypregnane - 3,20 -dione, 3,20 - pentane - 1,3 - diol diketal, 11β,17α - dihydroxypregnane - 3,20 - dione, 3,20 - hexane - 1,3 - diol diketal, 11β,17α - dihydroxypregnane - 3,20 - dione, 3,20 - heptane - 1,3 - diol diketal, 11β,17α - dihydroxypregnane-3,20 - dione, 3,20 - octane - 1,3 - diol diketal, and other like compounds which by hydrolysis as described in Examples 1B, 2A, 3B and 4B are productive of 11β,17α-dihydroxypregnane-3,20-dione.

It is to be understood that the invention is not to be limited to the exact details of operation or exact compounds shown and described as obvious modifications and equivalents will be apparent to one skilled in the art, and the invention is therefore to be limited only by the scope of the appended claims.

We claim:

1. A process for the production of 11β,17α-dihydroxypregnane-3,20-dione from 17α-hydroxypregnane-3,11,20-trione which comprises: mixing together 17α-hydroxypregnane-3,11,20-trione with an alkanediol containing from two to eight carbon atoms, inclusive, in the presence of an acid catalyst; reducing the thus-obtained 17α-hydroxypregnane - 3,11,20 - trione, 3,20 - cyclic diketal with a reducing agent to a 11β,17α-dihydroxypregnane-3,20-dione, 3,20-cyclic diketal; and hydrolyzing the thus-obtained 11β,17α-dihydroxypregnane-3,20-dione, 3,20-cyclic diketal with an acid to obtain 11β,17α-dihydroxypregnane-3,20-dione.

2. A process for the production of 11β,17α-dihydroxypregnane-3,20-dione from 17α-hydroxypregnane-3,11,20-trione which comprises: mixing together 17α-hydroxypregnane-3,11,20-trione with an organic ketal-forming agent selected from the group consisting of alkane-1,2-diols and alkane-1,3-diols, containing from two to eight carbon atoms, inclusive, in the presence of an acid catalyst; reducing the thus-obtained 17α-hydroxypregnane-3,11,20-trione, 3,20-cyclic diketal with a metallic hydride; and hydrolyzing, without isolating, the intermediate metal complex of the 11β,17α-dihydroxypregnane-3,20-dione, 3,20-cyclic diketal, with an acid at a temperature between about zero and one hundred degrees centigrade to obtain 11β,17α-dihydroxypregnane-3,20-dione.

3. A process for the production of 11β,17α-dihydroxypregnane-3,20-dione from 17α-hydroxypregnane-3,11,20-trione which comprises: mixing together 17α-hydroxypregnane-3,11,20-trione with ethylene glycol in the presence of an acid catalyst selected from the group consisting of benzenesulfonic acids and mineral acids at a temperature between about twenty and about 150 degrees centigrade; reducing the thus-obtained 17α-hydroxypregnane-3,11,20-trione, 3,20-ethylene glycol diketal with a metal hydride at a temperature between about zero and about one hundred degrees centigrade; and hydrolyzing the thus-obtained 11β,17α-pregnane-3,20-dione, 3,20-ethylene glycol diketal with an acid at a temperature between about zero and about one hundred degrees centigrade to obtain 11β,17α-dihydroxypregnane-3,20-dione.

4. A process for the production of 11β,17α-dihydroxypregnane-3,20-dione from 17α-hydroxypregnane-3,11,20-trione which comprises: mixing together 17α-hydroxypregnane-3,11,20-trione with propylene glycol in the presence of an acid catalyst selected from the group consisting of benezenesulfonic acids and mineral acids at a temperature between about twenty and about 150 degrees centigrade; reducing the thus-obtained 17α-hydroxypregnane-3,11,20-trione, 3,20-propylene glycol diketal with a metal hydride at a temperature between about zero and about one hundred degrees centigrade; and hydrolyzing the thus-obtained 11β,17α-pregnane-3,20-dione, 3,20-ethylene glycol diketal with an acid at a temperature between about zero and about one hundred degrees centigrade to obtain 11β,17α-dihydroxypregnane-3,20-dione.

5. 11β,17α-dihydroxypregnane-3,20-dione having the following formula

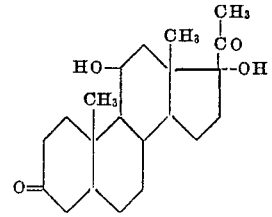

No references cited.